Dec. 31, 1968     D. W. TOEWS     3,419,282
PIPE TRAILER MEANS WITH TURNTABLE STRUCTURE
Filed Aug. 1, 1966     Sheet 1 of 3
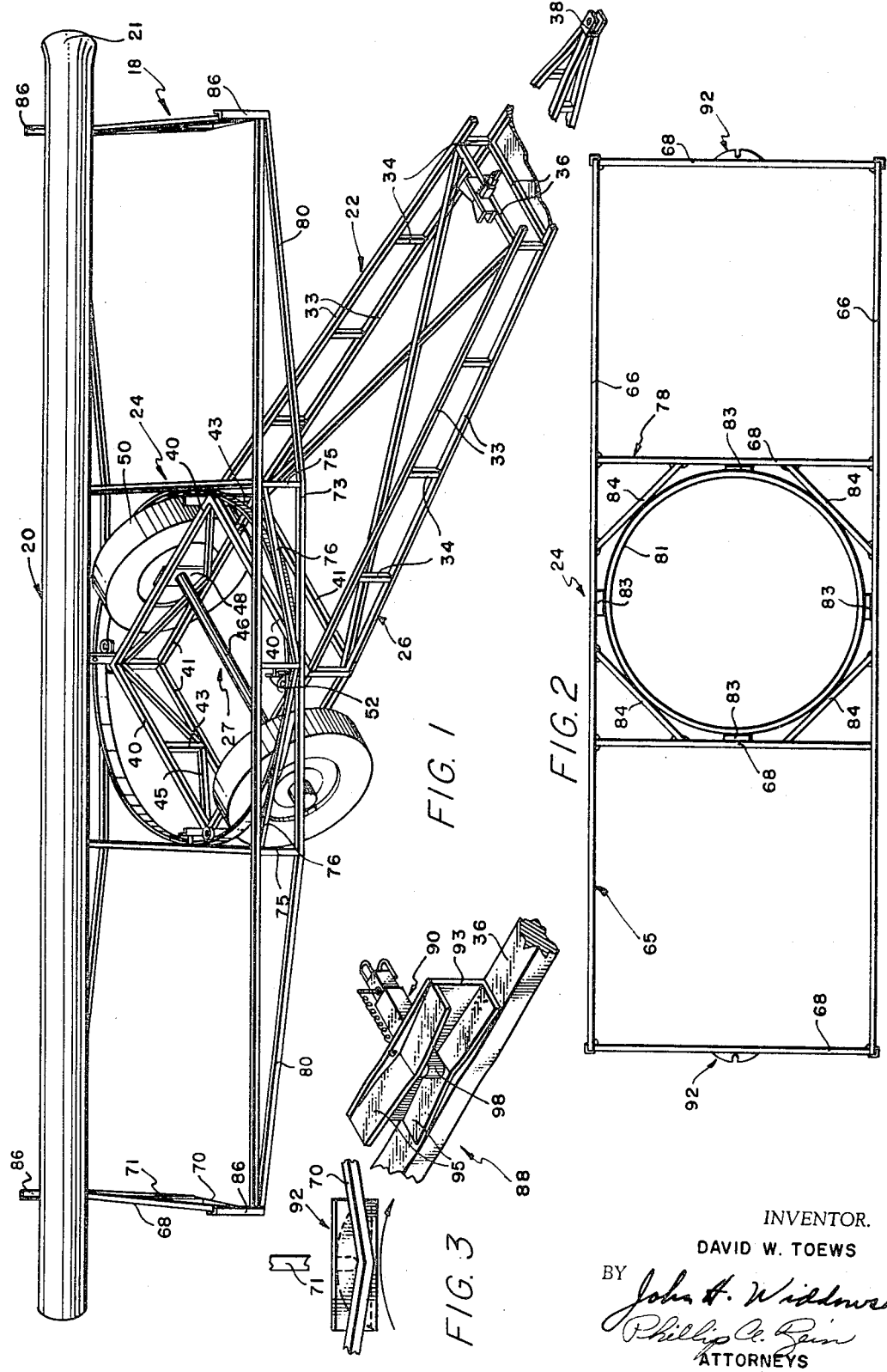
INVENTOR.
DAVID W. TOEWS
BY John H. Widdowson
Phillip A. ———
ATTORNEYS

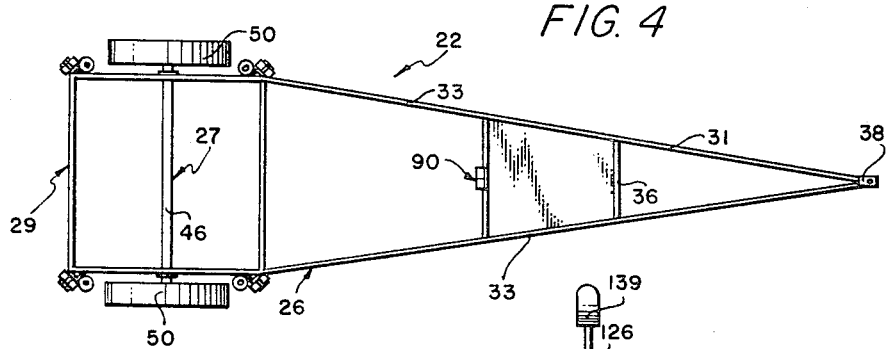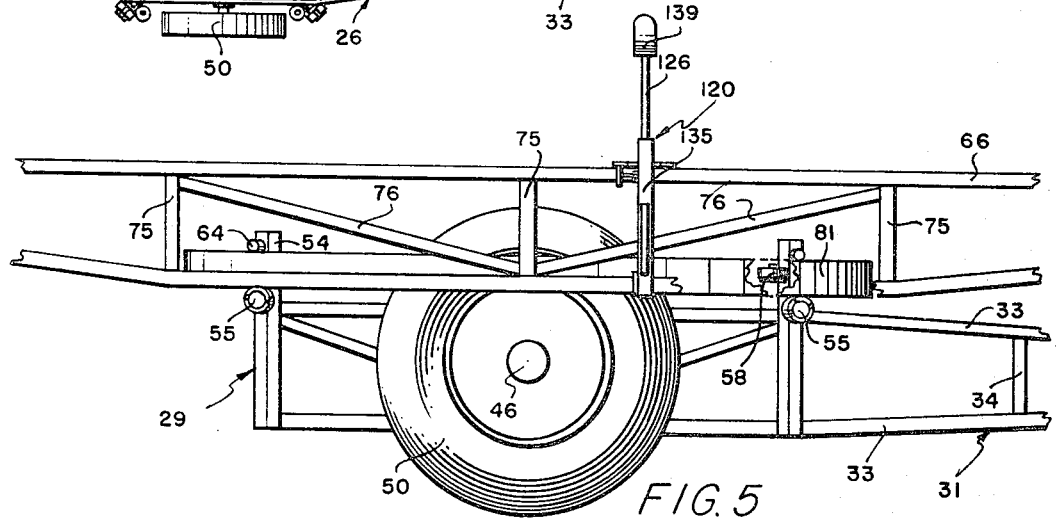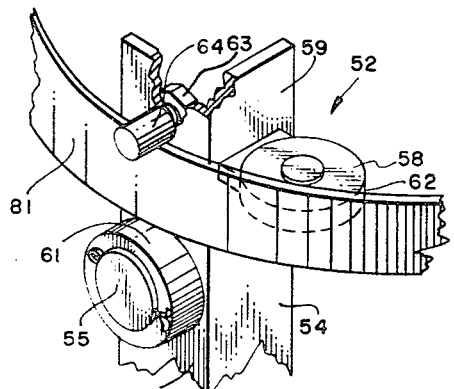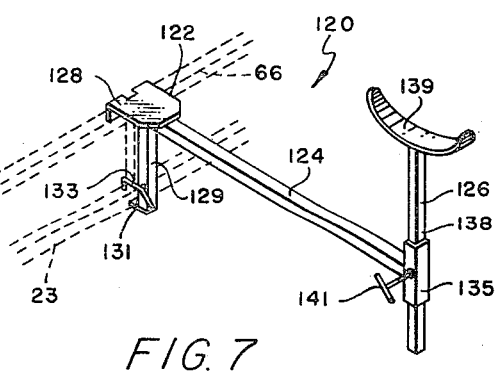

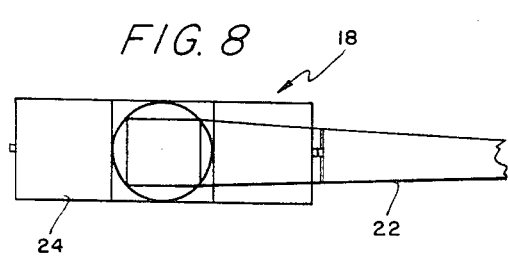
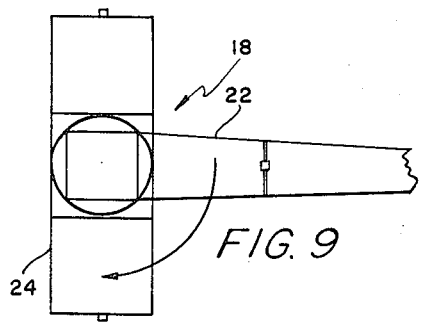
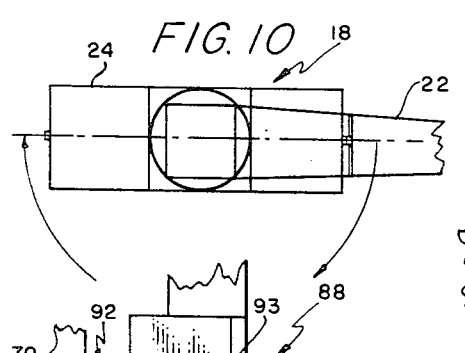
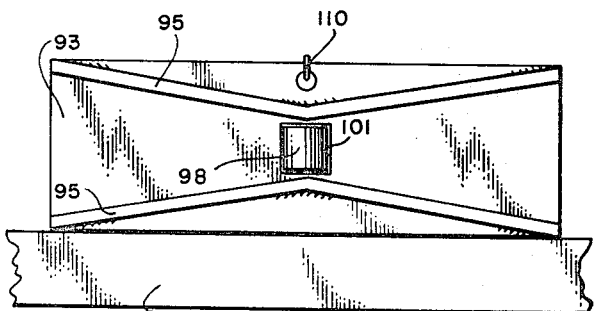
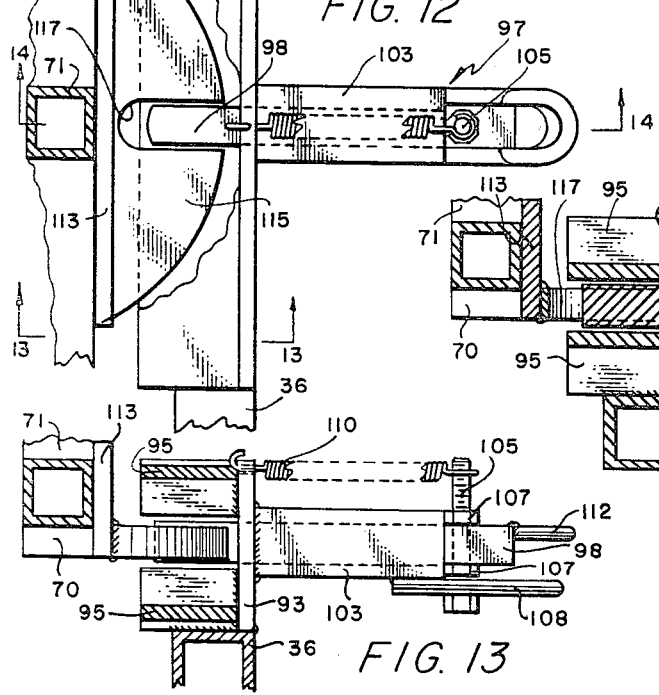
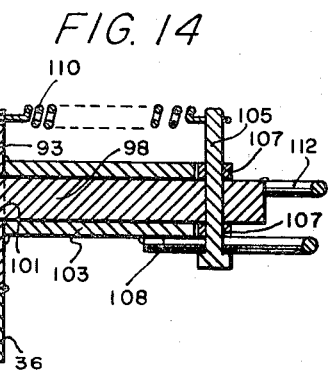

United States Patent Office 3,419,282
Patented Dec. 31, 1968

3,419,282
PIPE TRAILER MEANS WITH TURNTABLE STRUCTURE
David W. Toews, Montezuma, Kans. 67867
Filed Aug. 1, 1966, Ser. No. 569,273
4 Claims. (Cl. 280—63)

ABSTRACT OF THE DISCLOSURE

This invention is a trailer means adapted to be towed by a vehicle having a support frame means; a turntable means connected to the support frame means for rotatable movement; locking means to secure the support frame means to the turntable means in a given rotational position; and loader means connected to the turntable means providing a simplified means of loading material on the trailer means. More specifically, connecting means are provided for attaching a rotatable turntable means to a frame means providing lateral and vertical stability thereto.

---

This invention relates to a trailer means adapted to be towed by a vehicle, and, more particularly, to a trailer means for transporting elongated pipe members. Still, more specifically, this invention relates to a mobile trailer unit having a turntable adapted for rotation to aid in the loading and unloading thereof.

In accordance with the present invention, a new trailer means for transporting elongated irrigation pipe members is provided which is adapted to be pulled by a farm tractor or the like. The preferred specific embodiment of the trailer means includes a support frame means mounted on wheel means and a turntable means rotatably connected to the frame means. The turntable means has an elongated frame assembly and a plurality of upright braces operable to maintain the pipe members thereon. A latch means having cam plates secured to opposite ends of the turntable means, respectively, and a latch bar secured to the support frame means is operable to releasably secure the turntable means in a given rotational position. The turntable means is rotatably connected to the frame means by first and second roller members operable to vertically support and guide rotational movement of the turntable means about a central axis, respectively. Additionally, a mounting pin member secured to the frame means prevents vertical or tilting movement of the turntable means found, for example, under uneven pipe loads. A loader apparatus is releasably connectable to the frame assembly and has a laterally extended brace on which is adjustably connected a vertically arm member. The arm member has an upper cradle portion adapted to receive one end section of the pipe members for aid in moving the same on and off the trailer means.

Accordingly, it is an object of the invention to provide a new and novel trailer means having a rotatable turntable.

Another object of this invention is to provide a trailer means having a support frame means, a turntable means, means rotatably connecting the turntable means on the support frame means, and latch means operably secure the turntable means in various positions of rotation.

A further object of this invention is to provide a pipe trailer means having an elongated turntable means rotatably mounted on the support frame means, and a loader apparatus operable to aid in loading and unloading pipe members from the turntable means.

A still further object of this invention is to provide a pipe trailer means including a turntable rotatably mounted on a support frame means, a latch means operable to releasably secure the turntable means in different positions of rotation, and a loader apparatus connectable to the turntable means operable to assist in the loading and unloading of pipe members.

One other object of this invention is to provide a relatively inexpensive, self-contained and compact trailer means having a rotatable turntable.

Still one further object of this invention is to provide a trailer means for conveying elongated pipe members that is simple to operate, inexpensive to manufacture, simple to use, and rigid in construction.

Various other objects, advantages and features of the invention will become apparent to those skilled in the art from the following discussion, taken in conjunction with the accompanying drawings in which:

FIG. 1 is a perspective view of the trailer means of this invention supporting an elongated pipe member;

FIG. 2 is a reduced top plan view of the rotatable turntable of the trailer means of this invention;

FIG. 3 is a fragmentary enlarged perspective view of a locking means of the trailer means of this invention;

FIG. 4 is a reduced top plan view of the support base of the trailer means of this invention;

FIG. 5 is a fragmentary enlarged elevational view of the trailer means of this invention;

FIG. 6 is an enlarged fragmentary perspective view of a means for connecting the rotatable turntable to the support base of this invention;

FIG. 7 is a perspective view of a pipe loading means of the trailer means of this invention;

FIGS. 8, 9 and 10 are schematic top plan views illustrating the rotational positions of the turntable of the trailer means of this invention;

FIG. 11 is an enlarged fragmentary elevational view of a stationary portion of the locking means of this invention;

FIG. 12 is an enlarged fragmentary top plan view of the locking means of this invention;

FIG. 13 is a sectional view taken along lines 13—13 in FIG. 12; and

FIG. 14 is a sectional view taken along lines 14—14 in FIG. 12.

The following is a discussion and description of preferred specific embodiments of the new trailer means of the invention, such being made with reference to the drawings, whereupon the same reference numerals are used to indicate the same or similar parts and/or structure. It is to be understood that such discussion and descriptions is not to unduly limit the scope of the invention.

Referring now to the drawings in detail, and particularly to FIG. 1, the trailer means of this invention indicated generally at 18 is illustrated as having an elongated irrigation pipe member 20 carried thereupon. The pipe member 20 is of a conventional type having a bell shape connector section 21 at one end adapted for interfitting engagement about the other conventional end of a similar pipe member 20. The trailer means 18 consist of a basic support frame means 22 adapted for connection to a farm tractor or the like and having a turntable means 24 rotatably mounted thereon.

As shown in FIGS. 1 and 4, the support frame means 22 includes a frame structure 26 preferably constructed of tubular members of square shape in transverse cross section mounted on a wheel means 27 for movability. The frame structure 26 includes a square shaped turntable support section 29 secured to an elongated tongue section 31 which has forwardly converging tube members 33 interconnected by upright struts 34 and transverse brace members 36. The forward ends of the tube members 33 are connected to a hitch clamp 38 adapted for connection to a hitch member on the rear end of a tractor or the like.

The turntable support section 29 has opposed pairs of parallel upper and lower support members 40 and 41 having adjacent ends secured together and vertically supported by upright posts 43 and diagonal members 45. The wheel means 27 has an axle member 46 rotatably mounted in plates 48 secured to upper and lower support members 40, 41 of the support section 29 with wheels 50 rotatably connected to respective opposite ends of the axle member 46. It is seen that the turntable support section 29 is held above the supporting ground surface by the wheel means 27 and is readily transportable in the direction of the longitudinal axis of the tongue section 31. At the upper ends of each of the upright corner posts 43 is secured a connector means 52 adapted to rotatably support the turntable means 24.

As shown in FIG. 6, the connector means 52 includes vertically extended angle iron members 54 having first vertical support rollers 55 secured to legs 56 and second horizontal support rollers 58 secured to the other legs 59. The rollers 55 and 56 extend laterally of the iron members 54 and have rotatable contact portions 61 and 62, respectively, engageable with the turntable means 24 as will be explained. Additionally, each connector means 52 has a guide pin member 64 mounted transversely of the leg 56 with a securing nut 63 and positioned above the rollers 55 and 58 to prevent undesirable vertical tilting movement of the turntable means 24 for reasons to become obvious.

As best illustrated in FIGS. 1 and 2, the turntable means 24 includes an elongated carrier structure 65 having parallel supports 66 interconnected by transversely extended brace supports 68. Additionally, the outer ones of the brace supports 68 are strengthened by downwardly converging channels 70 having the lower ends connect together and to vertical struts 71. Similarly, the parallel supports 66 and the central ones of the brace supports 68 are given rigidity and vertical stability by tube members 73 secured by uprights 75 and diagonals 76 thereto to form a fencelike vertically extended square frame assembly 78. The uprights 75 are additionally connected to the outer corners of the carriage structure 66 by tubular struts 80 for added rigidity. Centrally of the frame assembly 78 is mounted a cylindrical connector ring 81 having the outer upright surface welded to the tube members 73 by spacer members 83. Additionally, the connector ring 81 is centered and supported by corner diagonals 84 having outer ends welded to the tube members 73 and the center portions thereof welded to the ring 81. In order to maintain the cargo such as the elongated pipe members 20 on the trailer means angle iron posts 86 are welded to each opposite end of the parallel supports 66 to restrict transverse rolling movement of the mounted pipe members 20.

In the assembly of the turntable means 24 on the support frame means 22, the guide pin members 64 are removed whereupon the connector ring 81 is mounted about the angle iron members 54 with the lower edge or surface thereof supported on the first rollers 55 (FIG. 6). The second rollers 58 are thereupon in contact with the inner vertical surface with the connector ring 81 to provide for both horizontal and vertical roller contact for easy rotational movement of the turntable means 24 about the axis of the connector ring 81. The guide pin members 64 are thereupon remounted in the legs 56 and cooperate to prevent undesired tilting and possible removal of the turntable means 24 by an unbalanced load or the like. It is seen that the turntable means 24 is freely rotatable on the support frame means 22 about the axis of the connector ring 81 and releasably secured in linear alignment with the tongue section 31 by a locking means 88.

As shown in FIG. 8, the locking means 88 includes a stationary latch assembly 90 secured to an upper one of the brace members 36 of the tongue section 31 of the frame structure 26 and a striker plate assembly 92 secured to each opposite end of the turntable means 24. More specifically, as shown in FIGS. 12–14, the latch assembly 90 includes an upright base plate 93 to which are secured as by welding a pair of guide plates 95 diverging outwardly from each side of the central portion of the base plate 93 to form a confining guide channel therebetween. Mounted on the base plate 93 is a latch mechanism 97 having one end of a latch bar 98 extended through an opening 101 in the base plate 93 positioned at the greatest restriction of the guide channel. The latch bar 98 is mounted within and confined in axial movement by a forwardly extended guide sleeve 103 secured to the base plate 93. On the forward end of the latch bar 98 is mounted a vertically extended bolt member 105 held in a given vertically adjusted position by nut members 107. The lower end of the bolt member 105 is slidable within the restrictions of a U-shaped alignment member 108 welded to the underside of the sleeve 103 and the upper end of the bolt member 105 is connected by a spring 110 to the base plate 93. It is seen, therefore, that the latch bar 98 is resiliently biased by the spring 110 rearwardly through the opening 101 and limited in movement in this direction by the abutment of the nut members 107 against the sleeve 103. Forward movement of the latch bar 98 is guided by the cooperating bolt member 105 and the curved end portion of the alignment member 108. Additionally, an attachment ring 112 secured to the forward end of the latch bar 98 is connected to a cable, rope, or the like (not shown) whereby the latching bar 98 can be readily actuated forwardly to the unlocked position by pulling on the attached rope or cable.

Each of the striker plate assemblies 92 consists of an upright main plate 113 secured as by welding to the channel 70 and vertical strut 71 connected to respective ones of the outer brace supports 68. At the lower edge of each main plate 113 is secured a laterally extended striker plate 115 having an outer edge portion of substantially semi-circular shape. Centrally of the striker plate 115 is a cut-out portion 117 adapted to receive the latch bar 98 of the latch assembly 90 therein in locking engagement as will be described.

In the use and operation of the trailer means 18 of this invention, the hitch clamp 38 of the tongue section 31 of the frame means 24 is connected to a corresponding hitch member on a farm tractor or the like. On rotation of the turntable means 24 clockwise from the position as shown in FIGS. 1 and 3, the striker plate 115 of one plate assembly 92 moves between the guide plates 95 and the outer curved surface contacts the latch bar 98 to move the same inwardly against the bias of the spring 110. On subsequent alignment of the cut-out portion 117 with the latch bar 98, the spring 110 resiliently moves the latch bar 98 therein to hold the turntable means 24 in the latched position as shown in FIG. 12. It is seen that the position of a striker plate assembly 92 mounted on opposite ends of the turntable means 24 permits latching thereof at each 180 degrees of rotation by the above-mentioned striker plates 115 in the manner described. The rope or cable attached to the attachment ring 112 is operable to unlatch the locking means 88 from a remote distance in case a load of elongated pipe members 20 prevents one from approaching the locking means 88 without difficulty.

It is seen, therefore, that a plurality of pipe members 20 are mountable on the turntable means 24 which in turn is readily rotatable to facilitate the loading and unloading thereof and to direct the same in the proper direction. In order to aid in the loading and unloading, a pipe loader assembly 120 is releasably mountable on the parallel supports 66 and adjacent tube members 73 of the turntable means 24.

More specifically as shown in FIG. 7, the loader assembly 120 consists of a bracket section 122 secured to one end of a laterally extended brace member 124 to which is connected a vertically adjustable cradle or pipe support arm section 126. The bracket section 122 has an L-shape attachment section 128 secured to an upright channel 129. A foot member 131 is secured to the lower end of the channel 129 whereby on securing to the turntable means 24, the attachment section 128 fits over the top surface of one of the parallel supports 66 and the foot member 131 mounts below a corresponding tube member 73. A lock finger 133 pivotally connected to the upright channel 129 is operable to engage the corresponding tube member 73 to secure the loader assembly 120 against lateral movement.

The other end of the brace member 124 is secured to a vertically mounted tube section 135 mounted about a tubular portion 138 of the arm section 126. The upper end of the arm section 126 has an arcuate cradle portion 139 extended in a direction transversely of the turntable means 24. The tubular portion 138 is vertically adjustable within the tube section 135 and held in a selectively adjusted position by turn lock screw 141.

In the use and operation of the loader assembly 120, the bracket section 122 is secured in a selected lateral position on the turntable means 24 and the arcuate cradle portion 139 is vertically adjustable to the desired height. One end of a pipe member 20 is then placed on the arcuate cradle portion 139 whereupon the opposite end of the pipe member 20 is movable laterally of the trailer means 18 to place this pipe end on the turntable means 24 in a desired location. Then, the one end of the pipe member 20 can be elevated from the cradle portion 139 and loaded on the turntable means 24. It is seen that the loader assembly 120 acts as an aid in walking the elongated and heavy pipe members 20 onto and of the trailer means 18. This new and novel loader structure permits the transportation and maneuverability of bulky irrigation pipe members by one person with a resultant monetary saving of time and labor.

As will be apparent from the foregoing description of the preferred embodiments of applicant's trailer means, a relatively simple and inexpensive structure has been provided which is easily attachable to the farm tractor or the like so as to provide a highly maneuverable and easily operable trailer means for transporting elongated pipe members and the like. Applicant's construction eliminates a great deal of time consuming and tedious work involved in the transportation and handling of elongated pipe members and the same results in a considerable savings of time and labor.

While the invention has been described in connection with the preferred specific embodiments thereof, it will be understood that this description is intended to illustrate and not to limit the scope of the invention, which is defined by the following claims.

I claim:
1. A trailer apparatus adapted to transport elongated pipe members, comprising:
    (a) a wheel supported elongated support frame having a hitch means adapted for connection to a farm tractor or the like,
    (b) turntable means rotatably mounted on said support frame and having substantially parallel elongated support members having end portions interconnected by transverse members forming a support for said pipe members,
    (c) locking means having a first portion secured to said frame means and second portions approximately oppositely secured to said turntable means movable into latching engagement with said first portion,
    (d) said frame means including a plurality of spaced upright post means, and
    (e) said post means having bearing connector means to provide said rotatable mounting of said turntable means and provide vertical and lateral support to said turntable means.
2. A trailer apparatus as described in claim 1, including:
    (a) loader means releasably connected to said turntable means including a support bracket connected to said support members; a brace member having one end secured to said support bracket and extended laterally therefrom; and an arm adjustably connected to the other end of said brace member whereby said arm supports one end of the pipe members for pivotal movement while the other end is mounted on said turntable means; and
    (b) said support bracket having a cooperating attachment section and a foot member releasably engageable with adjacent ones of said support members to provide substantial vertical and lateral stability while permitting said loader means to be selectively positioned axially of said support members.
3. A trailer apparatus as described in claim 1 wherein:
    (a) said post means on said frame means are equally radially spaced from a common vertical axis, and
    (b) said connector means having first and second roller means to rotatably connect and provide the vertical and lateral support, respectively, to said turntable means; and
    (c) said post means having pin means engageable with said turntable means to restrict vertical movement thereof.
4. A trailer apparatus as described in claim 1, wherein:
    (a) said first portion of said locking means having a pair of centrally converging guide plates, a central latch bar slidably connected to said guide plates, and a spring member connected to said latch bar biasing the same into a latched position, and
    (b) said second portions having laterally extended cam plates with central cut-out portions whereby said cam plates are engageable with said latch bar to move the same to an unlatched position and said spring member operable to move said latch bar into said cut-out portions to lock said turntable means in a given rotational position.

References Cited
UNITED STATES PATENTS

| | | | |
|---|---|---|---|
| 1,500,803 | 7/1924 | Colbyson | 298—9 |
| 1,716,877 | 6/1929 | Clement | 298—38 |
| 2,832,608 | 4/1958 | Martineau | 280—63 |

FOREIGN PATENTS

| | | |
|---|---|---|
| 741,700 | 8/1966 | Canada. |
| 1,050,671 | 9/1953 | France. |
| 1,367,814 | 6/1964 | France. |
| 166,307 | 2/1959 | Sweden. |

RICHARD J. JOHNSON, *Primary Examiner.*

U.S. Cl. X.R.

280—34, 400; 214—1, 151; 298—38